C. H. KOHLER.
EXTINGUISHER FOR TUBULAR LAMP BURNERS.
No. 9,859. Reissued Sept. 6, 1881.
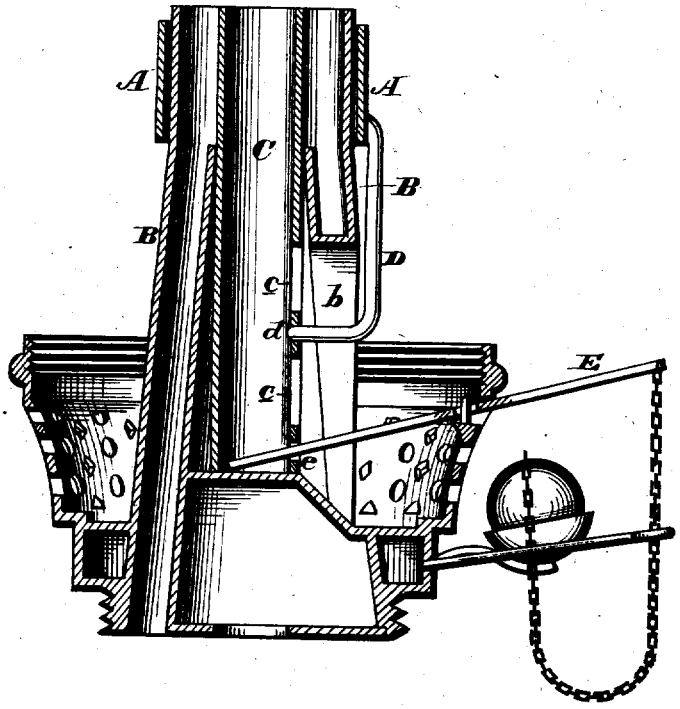
WITNESSES
E. L. Nottingham
Herman Moran.
INVENTOR
C. H. Kohler.
By H. A. Seymour.
ATTORNEY
N. PETERS, Photo-Lithographer, Washington, D. C.

UNITED STATES PATENT OFFICE

CHARLES HENRY KOHLER, OF CLEVELAND, OHIO.

EXTINGUISHER FOR TUBULAR LAMP-BURNERS.

SPECIFICATION forming part of Reissued Letters Patent No. 9,859, dated September 6, 1881.

Original No. 239,964, dated April 12, 1881. Application for reissue filed July 9, 1881. Patented in England March 21, 1877.

*To all whom it may concern:*

Be it known that I, CHARLES HENRY KOHLER, of Cleveland, in the county of Cuyahoga and State of Ohio, have invented a new and useful Improvement in Extinguishers for Tubular Lamp-Burners; and I do hereby declare that the following is a full and exact description of the same, reference being had to the accompanying drawing, and to the letters of reference marked thereon.

My invention relates to certain improvements in kerosene or fluid lamps; and the object I have in view is to so construct and arrange burners for tubular or similarly-arranged wicks or wick-holders that the lamp can be readily and conveniently extinguished without turning or blowing out the flame. I attain this object by the mechanism illustrated in the accompanying drawing, which is a sectional view of my improved burner, showing the arrangement of the various parts for accomplishing the purpose intended.

A represents a sleeve fitting over the upper part of the tubular wick-holder B, the conical shape of which is modified at the top so as to form a cylindrical extension within the sleeve, for the purpose of preventing the admission of air between the sleeve and tube, which would result if the conical shape were maintained when the sleeve is raised above said tube. If B were made of conical shape for its entire length, the sleeve A, to fit thereon as is necessary, also would have to be conical in shape. If this were the case, upon raising the sleeve there would be a space between the tube and sleeve, so that the air could not be shut off from the flame, and it would not be extinguished; hence the reason of my using the above-described sleeve and wick-holder.

C represents an inner tube for conducting air to the flame. This tube moves freely within the wick-tube B, its lower end resting upon a support inside said tube, arranged as shown, while its upper end is flush with that of tube B and forms a continuation of the inner lining of said tube, which extends only to about the point where the modification heretofore described begins. The air is admitted within this tube through an opening in the side of the wick-tube and corresponding openings through its side, as shown. The opening in the wick-tube is V-shaped, and extends from the base of the air-chamber, where it is broadest, to a point a short distance below the sleeve fitting upon said tube. This opening is represented by *b* in the drawing. The openings in tube C, which are represented by the letters *c c*, are separated by the continuation of the sides of said tube at the point *d*. If this division were not made, the air-opening in tube C would conform in shape to that in tube B.

D represents an arm, by means of which the sleeve A and tube C are firmly united, said arm being fastened to the lower part of said sleeve, and then, passing down outside of the wick-holder B, enters the air-opening *b*, where it is joined to tube C at the point *d*, as shown. By this arrangement the connected parts will move simultaneously, and upon being raised above the wick-holder will shut off the air from both sides of the wick at the same time and in the same operation. For the purpose of raising and lowering these connected parts, I employ a lever, E, which has its inner end passed through a slot, *e*, near the bottom of tube C, while its outer end passes through the sides of the air-chamber, where it is properly fulcrumed to be readily operated by the hand.

From the above description it will readily be seen that by depressing the free end of lever E the inner tube, C, and sleeve A, connected therewith by arm D, can be raised together, and thus in a simple and efficient way instantly extinguish the flame. The tube C and sleeve A are so arranged in relation to each other by means of the arm D that when tube C rests upon its support the sleeve A has its upper end a little below that of the wick-tube B, as shown.

Arm D is limited in its vertical movement by the upper part of opening *b*, against which it will strike when the tube and sleeve have been raised the proper distance by the lever operating them.

The simplicity of construction in my device obviates any tendency to failure in case of emergency, rendering it always efficient and reliable.

By means of a chain and weight attached to the free end of lever E and supported in a cup fastened to the neck of the burner, as shown, the flame of the lamp may be automatically extinguished in case it should be overturned, as very frequently happens, said weight falling from its cup and depressing the lever to which it is attached, and thus raising the sleeve and inner tube above the level of the wick and instantly extinguishing the flame; but I do not claim this construction, as the principal features of my device are embraced in the simultaneous movement of the inner tube and sleeve and the cylindrical shape of the upper part of the wick-tube, whereby air is prevented from entering between the sleeve and said tube, as heretofore described.

What I claim is—

1. The combination, with an Argand wick-tube consisting of an outer tube extending above the inner tube, of a vertically-adjustable sleeve encircling the upper portion of the outer tube, and a vertically-adjustable tube located within the inner tube of the wick-tube, substantially as set forth.

2. The combination, with an Argand wick-tube consisting of an outer tube extending above its inner tube, of a vertically-adjustable sleeve encircling the upper portion of the outer tube, and a vertically-adjustable tube fitting within the inner or short tube, and means for adjusting said sleeve and tube simultaneously, substantially as set forth.

3. An Argand wick-tube made conical throughout the length of its inner tube, the outer tube being provided with a cylindrical section, which extends above the upper end of the inner tube, in combination with a vertically-adjustable sleeve that encircles the cylindrical section of the outer tube, and a vertically-adjustable tube located within the inner tube and constructed to project above its upper end, substantially as set forth.

4. An Argand conical wick-tube the upper portion of which is of a cylindrical form, an adjustable sleeve surrounding the cylindrical portion, and a vertically-adjustable tube located inside of said cylindrical section, a wick-space being formed between said inner tube and the cylindrical portion of the outer tube, substantially as set forth.

5. The combination, with an Argand wick-tube, of two vertically-adjustable tubes, connected together and adapted to be moved in unison with each other, the outer tube or sleeve being located on the upper portion of the wick-tube, and the inner tube extending into and above the inner tube of the wick-tube, and forming an upper extension thereof, substantially as set forth.

6. An extinguishing tubular lamp-burner wherein are combined the sleeve A, wick-tube B, inner air-tube, C, arm D, firmly connecting said sleeve and air-tube, and lever E, the several parts constructed, arranged, and operating substantially as herein described, for the purpose set forth.

In testimony that I claim the foregoing I have hereunto set my hand this 5th day of July, 1881.

CHARLES HENRY KOHLER.

Witnesses:
L. BRECKENRIDGE,
J. H. HILLERMAN.